(12) United States Patent
Xiang (10) Patent No.: US 10,574,773 B2
(45) Date of Patent: Feb. 25, 2020

(54) METHOD, DEVICE, TERMINAL, SERVER AND STORAGE MEDIUM OF PROCESSING NETWORK REQUEST AND RESPONSE

(71) Applicant: PING AN TECHNOLOGY (SHENZHEN) CO., LTD., Shenzhen, Guangdong (CN)

(72) Inventor: Yangjun Xiang, Guangdong (CN)

(73) Assignee: PING AN TECHNOLOGY (SHENZHEN) CO., LTD., Shenzhen, Guangdong (CN)

( * ) Notice: Subject to any disclaimer, the term of this patent is extended or adjusted under 35 U.S.C. 154(b) by 217 days.

(21) Appl. No.: 15/579,266

(22) PCT Filed: Apr. 7, 2017

(86) PCT No.: PCT/CN2017/079671
§ 371 (c)(1),
(2) Date: Dec. 4, 2017

(87) PCT Pub. No.: WO2018/014594
PCT Pub. Date: Jan. 25, 2018

(65) Prior Publication Data
US 2018/0309842 A1 Oct. 25, 2018

(30) Foreign Application Priority Data
Jul. 20, 2016 (CN) .......................... 2016 1 0575852

(51) Int. Cl.
*G06F 15/16* (2006.01)
*H04L 29/08* (2006.01)
*H04L 29/06* (2006.01)

(52) U.S. Cl.
CPC .......... *H04L 67/2833* (2013.01); *H04L 67/02* (2013.01); *H04L 67/06* (2013.01); *H04L 67/1074* (2013.01); *H04L 67/42* (2013.01)

(58) Field of Classification Search
CPC . H04L 67/2833; H04L 67/1074; H04L 67/42; H04L 67/06; H04L 67/02; H04L 67/32
See application file for complete search history.

(56) References Cited

U.S. PATENT DOCUMENTS

2003/0084209 A1* 5/2003 Chadalapaka ........ G06F 3/0601
710/5
2012/0054295 A1 3/2012 Cai et al.
(Continued)

FOREIGN PATENT DOCUMENTS

CN 101442675 A 5/2009
CN 103297452 A 9/2013
(Continued)

OTHER PUBLICATIONS

International Search Report dated Jul. 11, 2017 issued in International Application No. PCT/US2017/079671, pp. 1-11.
(Continued)

*Primary Examiner* — John B Walsh
(74) *Attorney, Agent, or Firm* — Polsinelli PC (57) ABSTRACT

A method of processing a network request and response includes: merging a plurality of requests to obtain a merged request; transmitting the merged request to a server side; detecting a current status identification of the merged request; when the status indicated by the current status identification shows that data is transferring, receiving resource data corresponding to each request in the merged request and returned by the server side, and detecting the received resource data and obtaining a boundary identification contained in the received resource data; extracting and processing the resource data corresponding to each request in the merged request one by one according to the obtained boundary identification; and when the status indicated by the
(Continued)

current status identification shows that the data transferring is completed, stopping receiving the resource data.

18 Claims, 7 Drawing Sheets

(56) References Cited

U.S. PATENT DOCUMENTS

| | | | |
|---|---|---|---|
| 2014/0172868 A1 | 6/2014 | Lin et al. | |
| 2015/0270930 A1* | 9/2015 | Luby | H04L 1/0042 |
| | | | 714/751 |
| 2015/0373127 A1 | 12/2015 | Ly et al. | |
| 2016/0006818 A1 | 1/2016 | Van Den Abeele et al. | |
| 2017/0214759 A1* | 7/2017 | Timiskov | H04L 67/28 |

FOREIGN PATENT DOCUMENTS

| | | |
|---|---|---|
| CN | 103312803 A | 9/2013 |
| CN | 103731399 A | 4/2014 |
| CN | 104113564 A | 10/2014 |
| JP | 2006-330877 A | 12/2006 |
| WO | 2014/004955 A1 | 1/2014 |

OTHER PUBLICATIONS

Chinese Office Action dated Oct. 24, 2018 issued in counterpart patent application No. 201610575852.2. 8 pages.
European Search Report dated Feb. 5, 2019 issued in counterpart patent application No. 17 801 316.5. 8 pages.
Japanese Office Action dated Dec. 4, 2018 issued in counterpart patent application No. 2017-565714. 4 pages.
Mattson et al., "HTTP:MPLEX: An Application Layer Multiplexing Protocol for the Hypertext Transfer Protocol (HTTP)", 14:14 Proceedings Trim size: 9in. × 6in, Jul. 5, 2005, (pp. 1-12).
Mattson et al., "HTTP-MPLEX: An enhanced hypertext transfer protocol and its performance evaluation", Journal of Network and Computer Applications 32, 2009, (pp. 925-939).
Office Action dated Nov. 22, 2019 issued in corresponding Australian Patent Application No. 2017268628 (6 pages).

* cited by examiner

Device of processing a network request and response

METHOD, DEVICE, TERMINAL, SERVER AND STORAGE MEDIUM OF PROCESSING NETWORK REQUEST AND RESPONSE

CROSS-REFERENCE TO RELATED APPLICATION

This application is a National Phase filing under 35 U.S.C. § 371 of PCT/CN2017/079671, filed Apr. 7, 2017, which claims priority to Chinese Patent Application No. 2016105758522, entitled "METHOD, DEVICE OF PROCESSING NETWORK REQUEST AND RESPONSE" filed on, Jul. 20, 2016, the contents of which are expressly incorporated by reference herein in their entireties.

FIELD OF THE INVENTION

The present disclosure relates to a field of Internet technology, and more particularly relates to a method, a device, a terminal, a server, and a storage medium of processing a network request and response.

BACKGROUND OF THE INVENTION

When a user accesses a web page through a uniform resource locator (URL), the client will generate a Hyper Text Transport Protocol (HTTP) request and transmit the HTTP request to the server side to obtain resources related to the page. In order to optimize the performance of the client, multiple HTTP requests generated by the client can be chosen to be merged, thereby reducing the number of HTTP requests, which can reduce the time consumed by domain name system (DNS) request to reduce the server pressure. Since header information of the HTTP requests is reduced, such that performance of the bandwidth can be improved.

However, in a conventional manner, when the client merges the HTTP requests and transmits it to the server side, the server side will return all the resources requested by the merged HTTP request at one time. The client cannot use the resources until all the resources are received. Such that it takes a long time for the client to wait for all the resources to be received, which will cause the response of each request and the speed of displaying page to slow down in the case of merging HTTP requests.

SUMMARY OF THE INVENTION

According to various embodiments of the present disclosure, a method, a device, a terminal, a server, and a storage medium of processing a network request and response are provided.

A method of processing a network request and response includes:

merging a plurality of requests to obtain a merged request;

transmitting the merged request to a server side;

detecting a current status identification of the merged request;

when the status indicated by the current status identification shows that data is transferring, receiving resource data corresponding to each request in the merged request and returned by the server side, detecting the received resource data and obtaining a boundary identification contained in the received source data;

extracting and processing the resource data corresponding to each request in the merged request one by one according to the obtained boundary identification; and stopping receiving the resource data, when the status indicated by the current status identification shows that the data transferring is completed.

A method of processing a network request and response includes:

receiving a merged request transmitted by a client;

analyzing the merged request and obtaining resource data corresponding to each request in the merged request; and separating the resource data corresponding to each request in the merged request by the boundary identification, and returning the separated resource data to the client, such that when the client receives the resource data, the client obtains the boundary identification contained in the resource data, and extracts and processes the resource data corresponding to each request in the merged request one by one according to the obtained boundary identification.

A device of processing a network request and response includes:

a merging module used to merge a plurality of requests to obtain a merged request;

a transmitting module used to transmit the merged request to a server;

a detecting module used to detect a current status identification of the merged request;

a resource receiving module used to receive resource data returned by the server and corresponding to each request in the merged request, and used to detect the received resource data and obtain a boundary identification contained in the received resource data, when the status indicated by the current status identification shows that data is transferring;

a processing module used to extract and process the resource data corresponding to each request in the merged request one by one according to the obtained boundary identification; and a stop module used to stop receiving the resource data, when the status indicated by the current status identification shows that the data transferring is completed.

A device of processing a network request and response includes:

a request receiving module used to receive a merged request transmitted by a client;

an analysis module used to analyze the merged request and obtain resource data corresponding to each request in the merged request; and a returning module used to separate the resource data corresponding to each request in the merged request by the boundary identification, and used to return the separated resource data to the client, such that when the client receives source data, the client obtains the boundary identification contained in the resource data, and extracts and processes the resource data corresponding to each request in the merged request one by one according to the obtained boundary identification.

A terminal includes a processor, and a memory storing computer executable instructions, which, when executed by the processor cause the processor to perform steps including:

merging a plurality of requests to obtain a merged request;

transmitting the merged request to a server;

detecting a current status identification of the merged request;

when the status indicated by the current status identification shows that data is transferring, receiving resource data returned by the server and corresponding to each request in the merged request, detecting the received resource data and obtaining a boundary identification contained in the received resource data;

extracting and processing the resource data corresponding to each request in the merged request one by one according to the obtained boundary identification; and stopping receiving the resource data, when the status indicated by the current status identification shows that the data transferring is completed.

A server includes a processor, and a memory storing computer executable instructions, which, when executed by the processor cause the processor to perform steps including:

receiving a merged request transmitted by a client;

analyzing the merged request and obtaining resource data corresponding to each request in the merged request; and separating the resource data corresponding to each request in the merged request by the boundary identification, and returning the separated resource data to the client, such that when the client receives resource data, the client obtains the boundary identification contained in the resource data and extracts and processes the resource data corresponding to each request in the merged request one by one according to the obtained boundary identification.

At least one non-transitory computer-readable medium includes computer executable instructions, which, when executed by at least one processor cause the at least one processor to perform steps including:

merging a plurality of requests to obtain a merged request;

transmitting the merged request to a server;

detecting a current status identification of the merged request;

when the status indicated by the current status identification shows that data is transferring, receiving resource data returned by the server and corresponding to each request in the merged request, detecting the received resource data and obtaining a boundary identification contained in the received resource data;

extracting and processing the resource data corresponding to each request in the merged request one by one according to the obtained boundary identification; and stopping receiving the resource data, when the status indicated by the current status identification shows that the data transferring is completed.

At least one non-transitory computer-readable medium comprising computer executable instructions, which, when executed by at least one processor cause the at least one processor to perform steps including:

receiving a merged request transmitted by a client;

analyzing the merged request and obtaining resource data corresponding to each request in the merged request; and separating the resource data corresponding to each request in the merged request by the boundary identification, and returning the separated resource data to the client, such that when the client receives resource data, the client obtains the boundary identification contained in the resource data, and extracts and processes the resource data corresponding to each request in the merged request one by one according to the obtained boundary identification.

The details of one or more embodiments of the present disclosure will be presented with reference to the following drawings and description. Other characteristic, purposes and advantages of the present disclosure will be more apparent from the specification, drawing and claims.

BRIEF DESCRIPTION OF THE DRAWINGS

To illustrate the technical solutions according to the embodiments of the present invention or in the prior art more clearly, the accompanying drawings for describing the embodiments or the prior art are introduced briefly in the following. Apparently, the accompanying drawings in the following description are only some embodiments of the present invention, and persons of ordinary skill in the art can derive other drawings from the accompanying drawings without creative efforts.

DETAILED DESCRIPTION OF THE EMBODIMENTS

The present disclosure will be described in details in combination with the accompanying drawings and embodiments such that the purpose, technical solution and advantages of the present disclosure will be more apparent. It should be understood that the particular embodiments are described for the purpose of illustrating as opposed to restricting the present invention.

Figure 1:
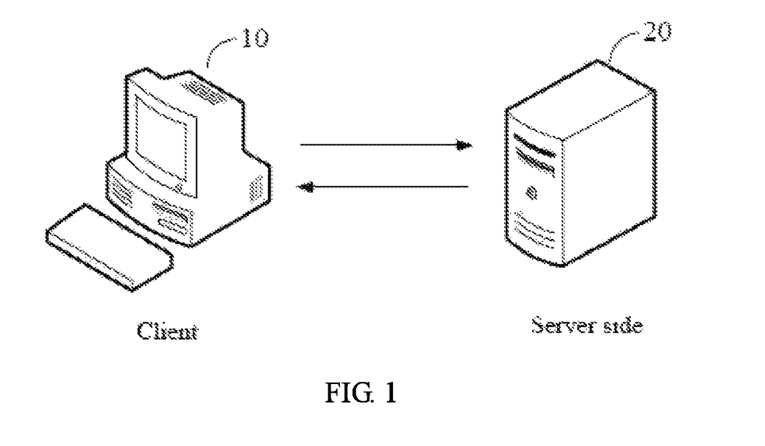
FIG. 1 is a schematic diagram of an implementation environment of a method of processing a network request and response according to an embodiment.

FIG. 1 is a schematic diagram of an implementation environment of a method of processing a network request and response according to an embodiment. Referring to FIG. 1, a client 10 located on a terminal merges a plurality of requests to obtain a merged request and transmits the merged request to a server side 20. The server side 20 located on the server receives and analyzes the merged request transmitted by the client 10, and obtains resource data corresponding to each request in the merged request. The server side 20 merges the obtained resource data and separates the resource data corresponding to each request by a boundary identification. The server side 20 returns the resource data corresponding to each request to the client 10. The client 10 detects a current status identification of the merged request. The client 10 receives the resource data corresponding to each request in the merged request and returned by the server, and detects the received resource data and obtains the boundary identification contained in the received resource data, when the status indicated by the current status identification shows that data is transferring. The client 10 extracts and processes the resource data corresponding to each request in the merged request one by one according to the obtained boundary identification. When the status indicated by the current status identification shows that the data transferring is completed, the client 10 stops receiving the resource data.

Figure 2A:
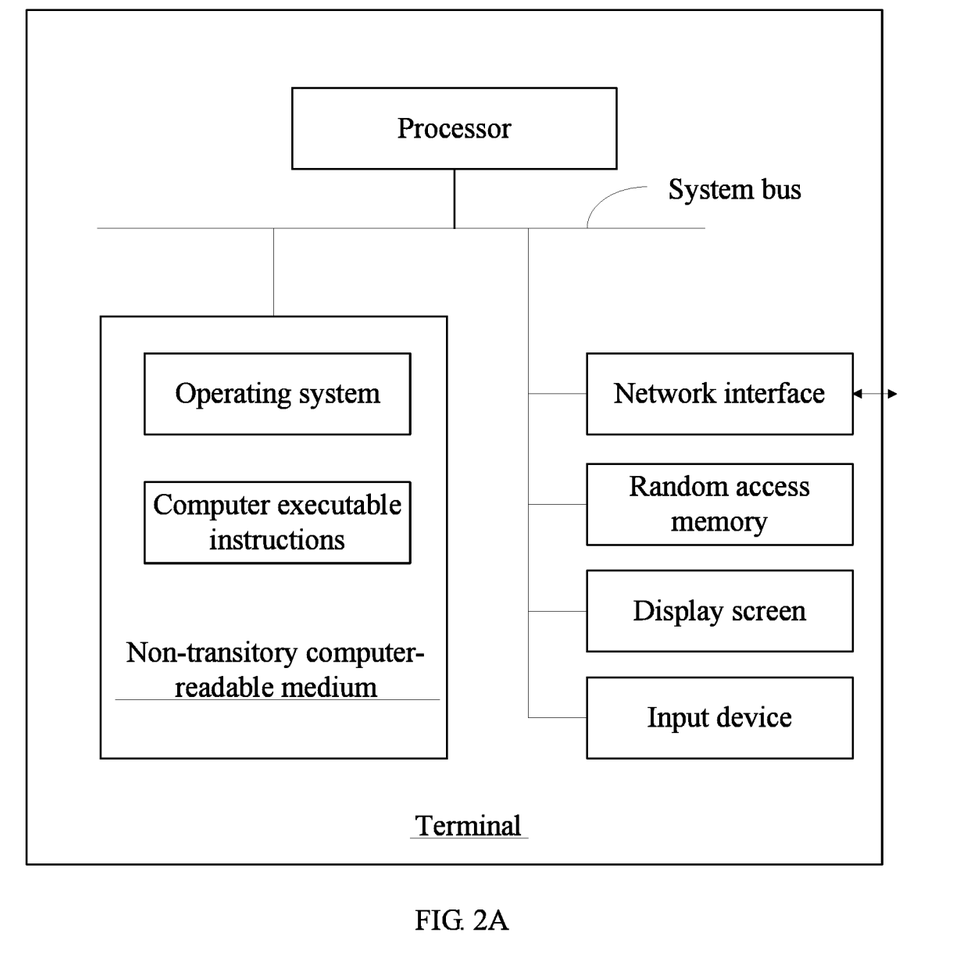
FIG. 2A is a block diagram of a terminal according to an embodiment.

FIG. 2A is a block diagram of the terminal on which the client 10 is located according to an embodiment. Referring to FIG. 2A, the terminal includes a processor, a non-transitory storage medium, a random access memory (RAM), a network interface, a display screen, and a input device, which are coupled via a system bus. The non-transitory storage medium of the terminal stores an operating system and computer-readable instructions, which are used to implement a method of processing a network request and response provided in the embodiment of the present disclosure. The processor is used to provide computation and control capabilities to support the entire operation of the terminal. The RAM of the terminal provides an operation environment for the operating system and the computer-readable instructions in the non-transitory storage medium. The network interface is used to communicate with the server, such as transmitting the merged request to the server side of the server and receiving the resource data corresponding to each request in the merged request and returned by the server side of the server. The display screen of the terminal can be a liquid crystal display (LCD) screen or an electronic ink (E-Ink) display screen, which is used as one of the output devices of the terminal. The input device can be a touch layer covered on the display screen or a button, a trackball, or a touch pad provided on a terminal housing, and it can also be an external keyboard, the touch pad or a mouse. The terminal can be a mobile phone, a tablet computer, or a personal digital assistant or a wearable device. Persons skilled in the art can understand that, the structure shown in FIG. 2A is only a part of the structure of the solution of the present disclosure, which does not impose limitation to the terminal. Specifically, and the terminal can include components more or less than those shown in the drawing, or can combine some components, or can have different component deployment.

Figure 2B:
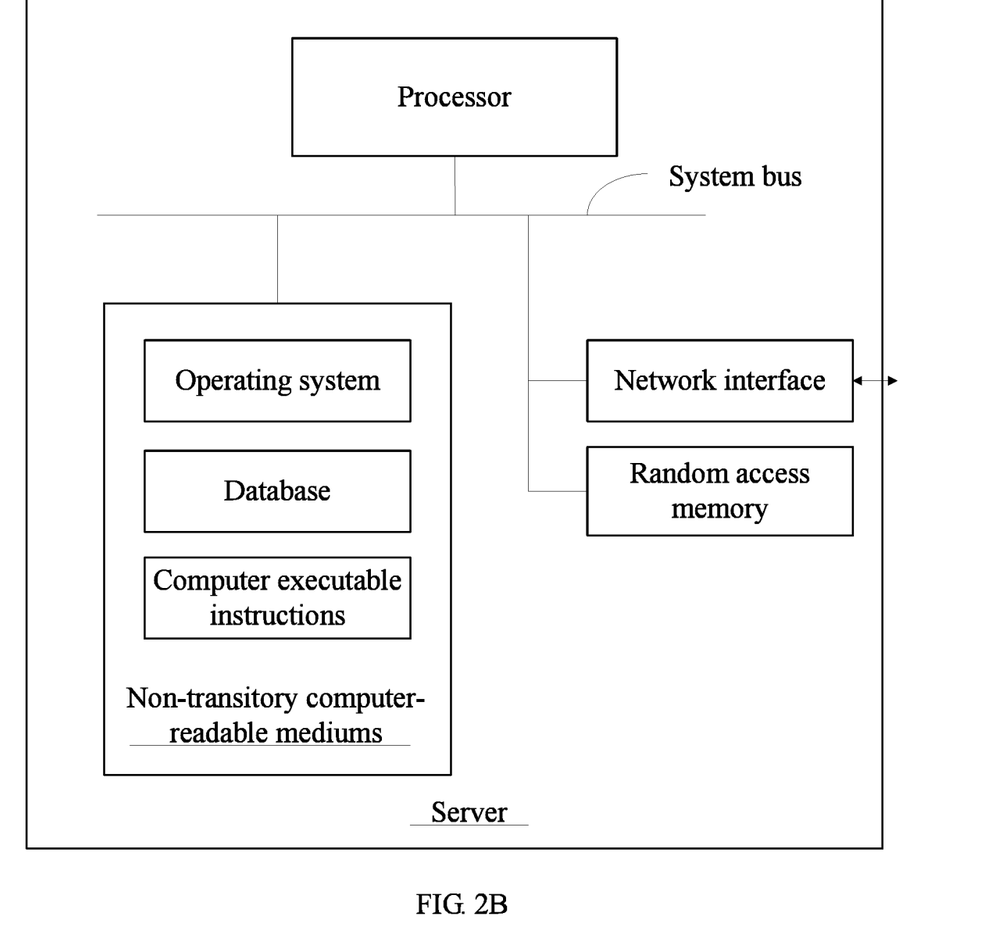
FIG. 2B is a block diagram of a server according to an embodiment.

FIG. 2B is a block diagram of a server on which the server side 20 is locates according to an embodiment. Referring to FIG. 2B, the server includes a processor, a non-transitory storage medium, a RAM, a network interface, a display screen, and a input device, which are coupled via a system bus. The non-transitory storage medium of the server stores an operating system and computer-readable instructions, which are used to implement a method of processing a network request and response provided in the embodiment of the present disclosure. Resource data is stored in the database. The processor is used to provide computation and control capabilities to support the entire operation of the server. The RAM of the server provides an operation environment with a high speed cache for the operating system and the computer-readable instructions in the non-transitory storage medium. The network interface of the server is used to communicate with a terminal, such as receiving a merged request transmitted by a client on the terminal, returning the resource data corresponding to each request in the merged request to the client on the terminal. The server can be implemented using an independent server or by way of a server group composed of a plurality of servers. Persons skilled in the art can understand that, the structure shown in FIG. 2B is only a part of the structure of the solution of the present disclosure, which does not impose limitation to the server. Specifically, the server can include more or less components than those shown in the drawing, or can combine some components, or can have different component deployment.

Figure 3:
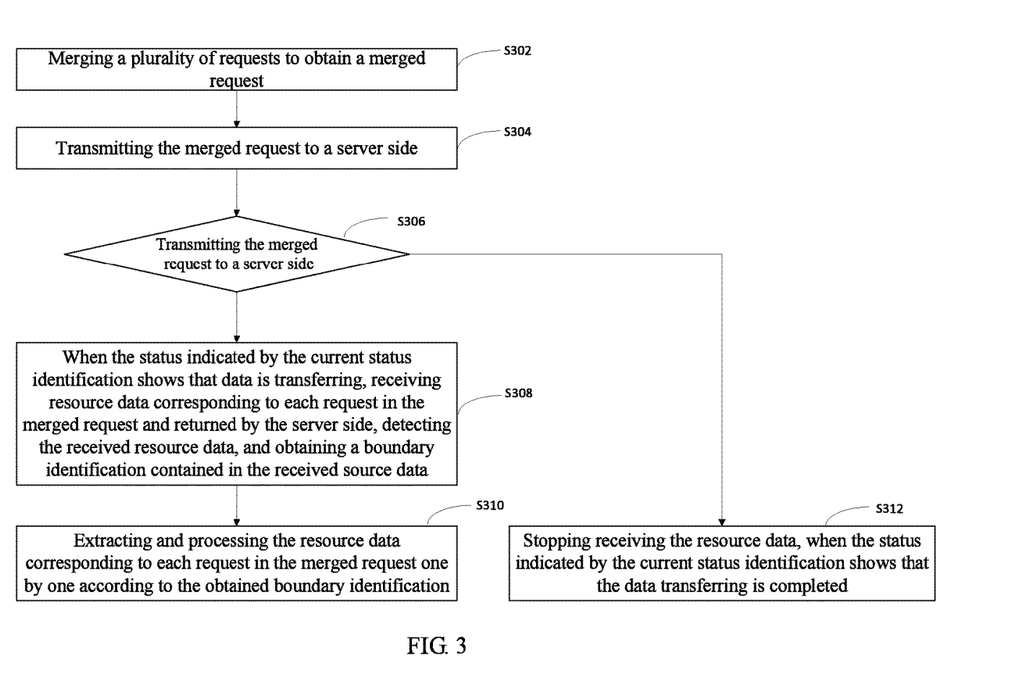
FIG. 3 is a flowchart of a method of processing a network request and response according to an embodiment.

Referring to FIG. 3, according to an embodiment, a method of processing a network request and response is provided, which can be applied to the terminal shown in FIG. 2A, and the method includes steps as follows.

In step S302, a plurality of requests are merged to obtain a merged request.

Users visit a page by a URL address via a client on the terminal, the client can generate a plurality of requests to ask for a page resource to a server side on a server. The request can be a HTTP request, a file transfer protocol (FTP) request. The client can merge the requests according to types of the resource data requested from the generated respective requests. The types of the resource data can include cascading style sheets (CSS) files, Java script (JS) files, and pictures. The requested resource data with the same type can be merged in a preset manner to obtain the merged request. The preset manner can be that predefining a separator to separate resources requested by different requests. For example, before the merger, two different CSS files correspond to requests of www.ttlsa.com/static/css/ttsa_concat.css and www.ttlsa.com/static/css/a.css, respectively. The merged request is: http://www.ttlsa.com/static??css/ttlsa_concat.css,css/a.css, after the symbol of "??" is a request content part, and the symbol of "," is used to separate the resource data requested by different requests. In an alternative embodiment, the requests which request the resource data of the CSS files and the JS files can be merged, but is not limited thereto.

In step S304, the merged request is transmitted to the server side.

The client can transmit the merged request to the server side. After the server side receives the merged request, the server can analyze the merged request to obtain target parameters of each request in the merged request. The target parameter refers to the requested resource data. The server can inquire and obtain the resource data corresponding to each request according to the target parameters of each request obtained by analyzing and return the obtained resource data to the client.

In step S306, a current status identification of the merged request is detected; when the status indicated by the current status identification shows that the data is transferring, step S308 is executed; when the status indicated by the current status identification shows that the data transferring is completed, step S312 is executed.

After the client transmits the merged request to the server side, the merged request may be in multiple statuses, which includes five statuses: uninitialized, initialized, transmitting data, data transferring, and transferring completion. For example, when the client transmits a header information of the merged request to the server side, the merged request is in the status of transmitting data. When the server side transmits back the response to the client and transmits the requested resource data, the merged request is in the status of data transfer. The current status identification of the merged request can be the ready status parameters, and the ready status parameters can correspond to five different values, representing different statues of the merged request, for example, the uninitialized, the initialized, the transmitting data, the data transferring, and the transferring completion can correspond to 0, 1, 2, 3, 4, respectively, but is not limited to thereto. The current status identification can also be represented by letters or symbols, except that the current status identification of the merged request is indicated by numbers.

In step S308, when the status indicated by the current status identification shows that the data is transferring, the resource data returned by the server and corresponding to each request in the merged request is received, and the received resource data is detected and the boundary identification contained in the received resource data is obtained.

When the client detects that the status indicated by the current status identification shows that the data is transferring, i.e., it means that the client receives the response information transmitted by the server side and can start receiving the resource data returned by the server side. The client can detect the received resource data when receiving the resource data corresponding to each request in the merged request returned by the server side. When the client detects that the boundary identification is contained in the received resource data, it means that the complete resource data corresponding to a request in the merged request has been successfully received, and this part of the resource data can be extracted for processing and using. The boundary identification can be used to separate the resource data corresponding to each request. The boundary identification can include a separator line and a time stamp. The time stamp can be a sequence of characters used to refer to the time at which the server side transmits the resource data. The boundary identification includes the separator line and the time stamp, which can guarantee the uniqueness of resource data.

In step S310, the resource data corresponding to each request in the merged request is extracted and processed one by one according to the obtained boundary identification.

When the client receives the resource data returned by the server side, whenever the boundary identification is detected, it means that the resource data corresponding to one of the requests in the merge request is received completely, then the resource data corresponding to the request can be extracted and processed. For example, the merged request contains two requests of a and b, and request a is used to request a file a.css, request b is used to request a file b.css. The server side obtains the file a.css and the file b.css and returns them to the client. The returned data contains a boundary identification for separating the file a.css and the file b.css. When the boundary identification is detected, it means that the file a.css or the file b.css have been successfully received, then the data received before boundary identification can be extract and processed. The client can place the extracted resource data into a template engine to compile to generate a corresponding hypertext markup language (HTML) character string, so as to render a display page.

In step S312, when the status indicated by the current status identification shows that the data transferring is completed, receiving of the resource data is stopped.

When the server transmits all the resource data, the client will receive a message segment with an end mark. At this time, the status indicated by the current status identification of the merged request shows that the data transferring is completed, and the client will stop receiving the resource data and achieve the resource data request. Then the client can choose to transmit a next merged request to the server side to obtain the corresponding resource data, or can also choose to close the connection with the server side.

According to the aforementioned method of processing the network request and response, the client merges the plurality of requests to obtain the merged request and transmits the merged request to the server side. The client detects the current status identification, when the status indicated by the current status identification shows that the data is transferring, then the client receives the resource data corresponding to each request in the merged request and returned by the server side. Then the client detects and obtains the boundary identification contained in the received resource data, and extracts and processes the resource data corresponding to each request in the merged request one by one according to the obtained boundary identification. The client can extract and process the resource data requested by each request in the process of transmitting the resource data. There is no need to wait for all resource data to be transferred completely before using the resource data, which accelerates the response speed of each request in the case of merging the request, thereby speeding up the rendering display of the page.

Figure 4:
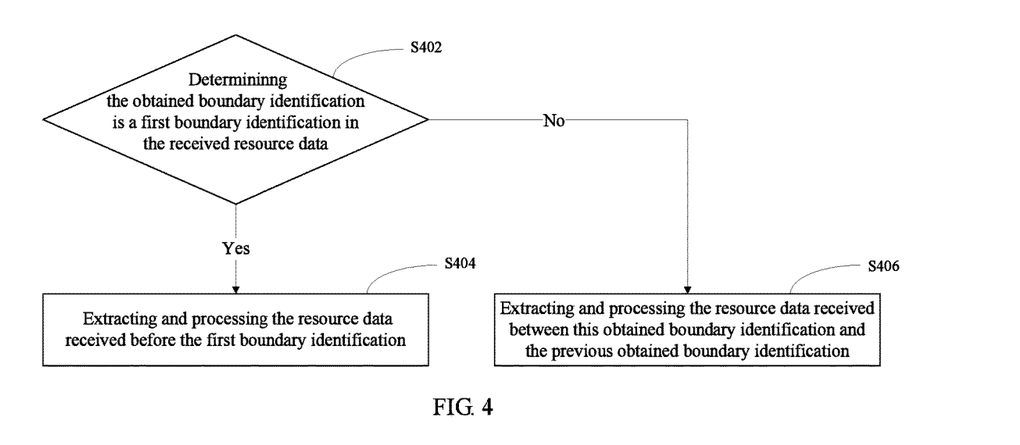
FIG. 4 is a flowchart of extracting and processing resource data corresponding to each request in a merged request by a client according to an obtained boundary identification according to an embodiment.

Referring to FIG. 4, according to an embodiment, the step S310 of extracting and processing the resource data corresponding to each request in the merged request one by one according to the obtained boundary identification includes:

In step S402, whether the obtained boundary identification is the first boundary identification in the received resource data or not is determined. If so, step S404 is executed, or else, step S406 is executed.

When the client receives the resource data returned by the server side, whenever the boundary identification is detected, whether the boundary identification is a first boundary identification or not is determined, i.e., whether it is the first time to detect that the received resource data contains the boundary identification.

In step S404, the resource data received before the first boundary identification is extracted and processed.

If the obtained boundary identification is the first boundary identification in the received resource data, i.e., when it is the first time for the client to detect that the received resource data contains the boundary identification, it means that the received resource data received before the first boundary identification corresponds to a request in the merge request resource data, then the previously received resource data is extracted and processed.

In step S406, the resource data received between the current obtained boundary identification and the last obtained boundary identification is extracted and processed.

Figure 5:
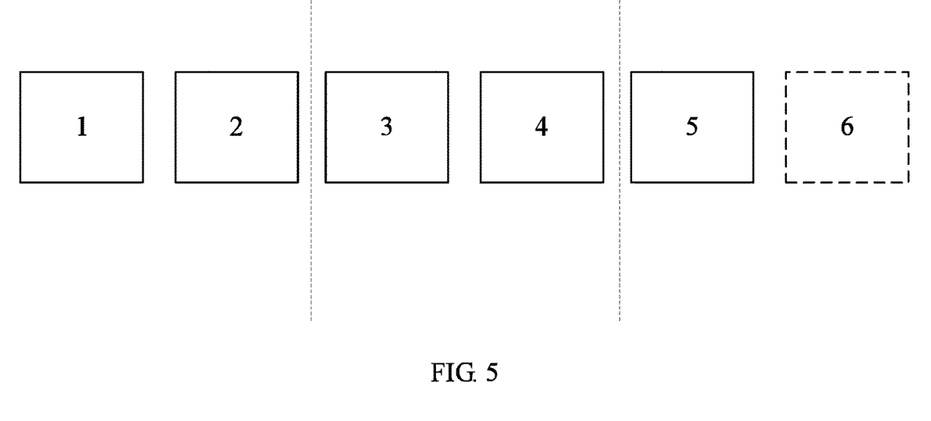
FIG. 5 is a schematic diagram of returning resource data corresponding to each request in a merged request to a client according to an embodiment.

If the obtained boundary identification is not the first boundary identification in the received resource data, i.e., it is not the first time that the client has detected the boundary identification contained in the received resource data, which means that the resource data received between this detected boundary identification and the last detected boundary identification corresponds to a request in the merged request. Then the resource data received between the current obtained boundary identification and the last obtained boundary identification is extracted and processed. For example, if the client obtains the boundary identification for the second time, the resource data received between the first obtained boundary identification and the second obtained boundary identification is extracted and processed. Referring to FIG. 5, FIG. 5 is a schematic diagram of the client receiving the resource data returned by the server side according to an embodiment. The client receives data 1, data 2, . . . , and data 6 from the server side. When the client receives the data 2, it is the first time to detect the boundary identification, which means that the data 1 and data 2 received before the boundary identification are resource data corresponding to one of the requests in the merged request. The resource data in the data 1 and data 2 is extracted and processed. When the client receives the data 4, the boundary identification is detected for the second time, which means that the data 3 and the data 4 received between the firstly detected boundary identification and the secondly detected boundary identification are resource data corresponding to another request in the merged request, and the resource data in the data 3 and the data 4 is extracted and processed.

According to an embodiment, after the step S312 of stopping receiving the resource data when the status indicated by the current status identification shows that the data transferring is completed, the method further includes: the resource data received after the last obtained boundary identification is extracted and processed.

When the client receives all the resource data transmitted by the server side, the resource data received after the last obtained boundary identification can be extracted and processed, and the resource data received after the last obtained boundary identification corresponds to one of the requests in the merged request. In an alternative embodiment, a start identification and an end identification can be set. The start identification is placed at the forefront of all the resource data, and the end identification is placed at the end of all the resource data. When the client receives all the resource data transmitted by the server side, the resource data received between the last obtained boundary identification and the end identification can be extracted and processed. When the obtained boundary is the first boundary identification of the received resource data, the resource data received between the start identification and the first boundary identification can be extracted and processed, but is not limited thereto.

In the illustrated embodiment, in the process of transmitting the resource data, the client extracts and processes the resource data corresponding to each request in the merged request according to the obtained boundary identification. There is no need to wait for all resource data to be transferred completely before using the resource data, which accelerates the response speed of each request in the case of merging the request, thereby speeding up the rendering display of the page.

Figure 6:
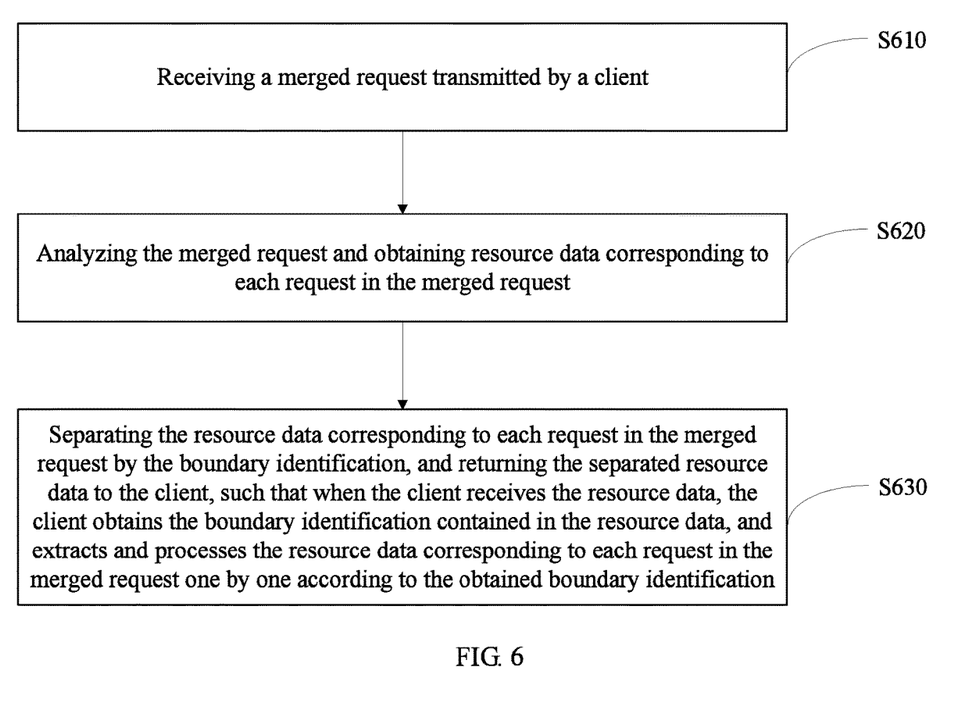
FIG. 6 is a flowchart of a method of processing a network request and response according to another embodiment.

Referring to FIG. 6, according to an embodiment, a method of processing a network request and response is provided, which is applied to a server shown in FIG. 2B, and the method includes steps as follows:

In step S610, a merged request transmitted by a client is received.

The client on a terminal merges the generated multiple requests to obtain the merged request, and transmits the merged request to a server side on the server. The server side receives the merged request transmitted by the client.

In step S620, the merged request is analyzed to obtain resource data corresponding to each request in the merged request.

After the server side receives the merged request transmitted by the client, the server side can analyze the merged request and obtain the resource data corresponding to each request in the merged request according to an analysis result.

Figure 7:
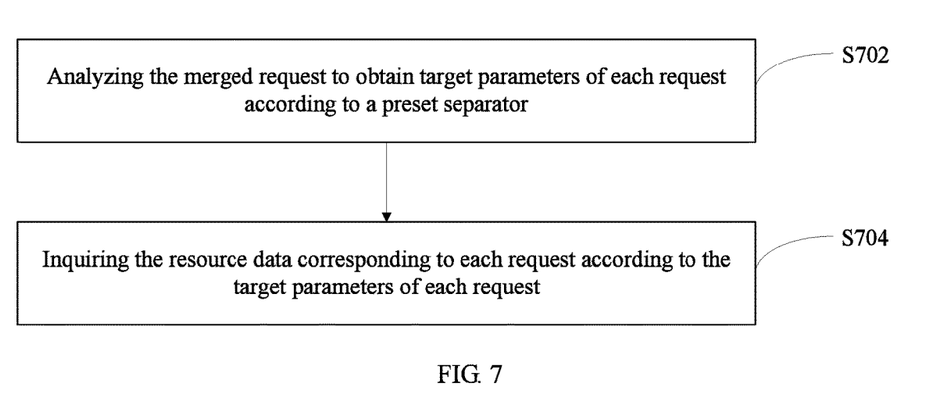
FIG. 7 is a flowchart of analyzing a merged request, by a server, according to an embodiment.

Referring to FIG. 7, according to an embodiment, the step S620 of analyzing the merged request and obtaining resource data corresponding to each request in the merged request includes:

In step S702, the merged request is analyzed to obtain target parameters of each request according to a preset separator.

When the client performs merging requests, the resource data requested by the different requests can be separated by the preset separator. For example, "," is used as the separator to separate the resource data requested by the different requests. When the server side analyzes the merged request, the server side can analyze main body part of the merged request information according to the separator predetermined with the client to obtain the target parameters of each request, and the target parameter can be used to refer to the requested resource data.

In step S704, the resource data corresponding to each request is inquired according to the target parameters of each request.

The server inquires and obtains the resource data corresponding to each request according to the target parameters of each request obtained by analyzing. For example, the server side analyzes the merged request to obtain the target parameters including a.css, b.css and c.css, i.e., the merged request contains three requests, which request a file a.css, a file b.css and a file c.css, respectively. Such that the server side inquires and obtains the corresponding file a.css, file b.css and file c.css according to the target parameters, and transmits the obtained resource data to the client.

In step S630, the resource data corresponding to each request in the merged request is separated by the boundary identification, and the separated resource data is returned to the client. Such that when the client receives the resource data, the client obtains the boundary identification contained in the resource data, and extracts and processes the resource data corresponding to each request in the merged request one by one according to the obtained boundary identification.

The server side can transmit response information to the client and return the resource data corresponding to each request in the merged request to the client. The boundary identification can be added after the resource data corresponding to different requests in the merged request by the server side, so as to separate the resource data corresponding to the different requests. It is not essential for the server side to separate the resource data in the order of each request in the merge request. The boundary identification can include a separator line and a time stamp. The time stamp can be a sequence of characters used to refer to the time at which the server side transmits the resource data. The server side can return the separated resource data to the client. The client can detect the received resource data, when the client receives the resource data corresponding to each request in the merged request returned by the server side. When the client detects that the boundary identification is contained in the received resource data, it means that the complete resource data corresponding to a request in the merged request has been successfully received, and this part of the resource data can be extracted for processing and using.

According to the aforementioned method of processing the network request and response, the server side receives the merged request transmitted by the client and analyzes the merged request to obtain the resource data corresponding to each request in the merged request. After the server side separates the resource data corresponding to different requests by the boundary identification, the separated resource data is returned to the client. Such that the client detects the boundary identification contained in the received resource data when receiving the resource data, and then extracts and processes the resource data corresponding to each request in the merged request one by one according to the obtained boundary identification. The client can extract and process the resource data requested by each request in the process of transmitting the resource data. There is no need to wait for all resource data to be transferred completely before using the resource data, which accelerates the response speed of each request in the case of merging the request, thereby speeding up the rendering display of the page.

Figure 8:
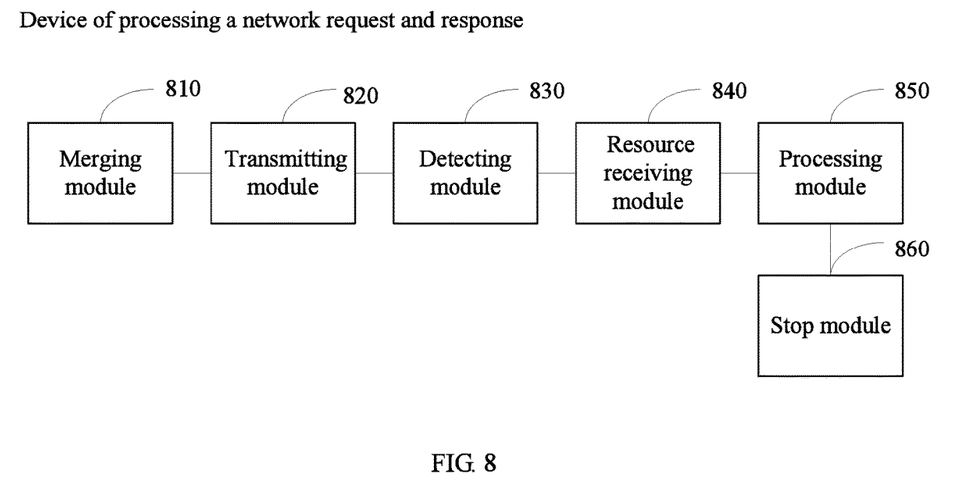
FIG. 8 is a block diagram of a device of processing a network request and response according to an embodiment.

Referring to FIG. 8, according to an embodiment, a device of processing a network request and response is provided.

The device includes a merging module 810, a transmitting module 820, a detecting module 830, a resource receiving module 840, a processing module 850, and a stop module 860.

The merging module 810 is used to merge a plurality of requests to obtain a merged request.

Users visit a page by a URL address via a client on the terminal, the client can generate a plurality of requests to ask for a page resource to a server side on a server. The request can be a HTTP request, a FTP request. The client can merge the requests according to types of the resource data requested from the generated respective requests. The types of the resource data can include CSS files, JS files, and pictures. The requested resource data with the same type can be merged in a preset manner to obtain the merged request. The preset manner can be that predefining a separator to separate resources requested by different requests. For example, before the merger, two different CSS files correspond to requests of www ttlsa.com/static/css/ttsa_concat.css and www.ttlsa.com/static/css/a.css, respectively. The merged request is: http://www.ttlsa.com/static??css/ttlsa_concat.css,css/a.css, after the symbol of "??" is a request content part, and the symbol of "," is used to separate the resource data requested by different requests. In an alternative embodiment, the requests which request the resource data of the CSS files and the JS files can be merged, but is not limited thereto.

The transmitting module 820 is used to transmit the merged request to a server side.

The client can transmit the merged request to the server side. After the server side receives the merged request, the server side can analyze the merged request to obtain target parameters of each request in the merged request. The target parameter refers to the requested resource data. The server side can inquire and obtain the resource data corresponding to each request according to the target parameters of each request obtained by analyzing and return the obtained resource data to the client.

The detecting module 830 is used to detect a current status identification of the merged request.

After the client transmits the merged request to the server side, the merged request may be in multiple statuses, which includes five statuses: uninitialized, initialized, transmitting data, data transferring, and transferring completion. For example, when the client transmits a header information of the merged request to the server side, the merged request is in the status of transmitting data. When the server side transmits back the response to the client and transmits the requested resource data, the merged request is in the status of data transfer. The current status identification of the merged request can be the ready status parameters, and the ready status parameters can correspond to five different values, representing different statues of the merged request, for example, the uninitialized, the initialized, the transmitting data, the data transferring, and the transferring completion can correspond to 0, 1, 2, 3, 4, respectively, but is not limited to thereto. The current status identification can also be represented by letters or symbols, except that the current status identification of the merged request is indicated by numbers.

The resource receiving module 840 is used to receive resource data returned by the server side and corresponding to each request in the merged request. The resource receiving module 840 is used to detect the received resource data and obtain a boundary identification contained in the received resource data, when the status indicated by the current status identification shows that the data is transferring.

When the client detects that the status indicated by the current status identification shows that the data is transferring, i.e., it means that the client receives the response information transmitted by the server side and can start receiving the resource data returned by the server side. The client can detect the received resource data when receiving the resource data corresponding to each request in the merged request returned by the server side. When the client detects that the boundary identification is contained in the received resource data, it means that the complete resource data corresponding to one of requests in the merged request has been successfully received, and this part of the resource data can be extracted for processing and using. The boundary identification can be used to separate the resource data corresponding to each request. The boundary identification can include a separator line and a time stamp. The time stamp can be a sequence of characters used to refer to the time at which the server side transmits the resource data. The boundary identification includes the separator line and the time stamp, which can guarantee the uniqueness of resource data.

The processing module 850 is used to extract and process the resource data corresponding to each request in the merged request one by one according to the obtained boundary identification.

When the client receives the resource data returned by the server side, whenever the boundary identification is detected, it means that the resource data corresponding to one of the requests in the merge request is received completely, then the resource data corresponding to the request can be extracted and processed. For example, the merged request contains two requests of a and b, and request a is used to request a file a.css, request b is used to request a file b.css. The server side obtains the file a.css and the file b.css and returns them to the client. The returned data contains a boundary identification for separating the file a.css and the file b.css. when the boundary identification is detected, it means that the file a.css or the file b.css have been successfully received, then the data received before boundary identification can be extract and processed. The client can place the extracted resource data into a template engine to compile to generate a corresponding HTML character string, so as to render a display page.

When the status indicated by the current status identification shows that the data transferring is completed, the stop module 860 is used to stop receiving the resource data.

When the server transmits all the resource data, the client will receive a message segment with an end mark. At this time, the status indicated by the current status identification of the merged request shows that the data transferring is completed, and the client will stop receiving the resource data and achieve the resource data request. Then the client can choose to transmit a next merged request to the server side to obtain the corresponding resource data, or can also choose to close the connection with the server side.

According to the aforementioned device of processing the network request and response, the client merges the plurality of requests to obtain the merged request and transmits the merged request to the server side. The client detects the current status identification, when the status indicated by the current status identification shows that the data is transferring, then the client receives the resource data corresponding to each request in the merged request and returned by the server side. Then the client detects and obtains the boundary identification contained in the received resource data, and extracts and processes the resource data corresponding to each request in the merged request one by one according to the obtained boundary identification. The client can extract and process the resource data requested by each request in the process of transmitting the resource data. There is no need to wait for all resource data to be transferred completely before using the resource data, which accelerates the response speed of each request in the case of merging the request, thereby speeding up the rendering display of the page.

According to an embodiment, the processing module 850 is further used to extract and process the resource data received before the first boundary identification when the obtained boundary identification is a first boundary identification in the received resource data. The processing module 850 is further used to extract and process the resource data received between the current obtained boundary identification and the last obtained boundary identification when the obtained boundary identification is not the first boundary identification in the received resource data.

When the client receives the resource data returned by the server side, whenever the boundary identification is detected, whether the boundary identification is a first boundary identification or not is determined, i.e., whether it is the first time to detect that the received resource data contains the boundary identification. If the obtained boundary identification is the first boundary identification in the received resource data, i.e., when it is the first time for the client to detect that the received resource data contains the boundary identification, it means that the resource data received before the first boundary identification corresponds to a request in the merge request resource data, then the previously received resource data is extracted and processed. If the obtained boundary identification is not the first boundary identification in the received resource data, i.e., it is not the first time that the client has detected the boundary identification contained in the received resource data, which means that the resource data received between this detected boundary identification and the last detected boundary identification corresponds to a request in the merged request. Then the resource data received between the current obtained boundary identification and the last obtained boundary identification is extracted and processed. For example, if the client obtains the boundary identification for the second time, the resource data received between the first obtained boundary identification and the second obtained boundary identification is extracted and processed.

The processing module 850 is further used to extract and process the resource data received after the last obtained boundary identification.

When the client receives all the resource data transmitted by the server side, the resource data received after the last obtained boundary identification can be extracted and processed, and the resource data received after the last obtained boundary identification is the resource data corresponds to one of the request in the merged request. In an alternative embodiment, a start identification and an end identification can be set. The start identification is placed at the forefront of all the resource data, and the end identification is placed at the end of all the resource data. When the client receives all the resource data transmitted by the server side, the resource data received between the last obtained boundary identification and the end identification can be extracted and processed. When the obtained boundary is the first boundary identification of the received resource data, the resource data received between the start identification and the first boundary identification can be extracted and processed, but is not limited thereto.

In the illustrated embodiment, in the process of transmitting the resource data, the client extracts and processes the resource data corresponding to each request in the merged request according to the obtained boundary identification. There is no need to wait for all resource data to be transferred completely before using the resource data, which accelerates the response speed of each request in the case of merging the request, thereby speeding up the rendering display of the page.

The various modules of the device of processing the network request and response can be implemented, in part or as a whole, by software, hardware or the combinations thereof. For example, in terms of a hardware implementation, the aforementioned merging module 810 can receive a URL address input by the users via the input device on the terminal, and merge the plurality of generated requests to obtain the merged request via the processor. The input device can be a touch layer covered on the display screen or a button, a trackball, or a touch pad provided on a terminal housing, and it can also be an external keyboard, the touch pad or a mouse. The processor can be a central processing unit (CPU) or a microprocessor. The transmitting module 820 can transmit the merged request to the server side on the server via a network interface of the terminal. The network interface can be an Ethernet card or a wireless card. The aforementioned modules can be embedded in or independent from the processor(s) of the terminal, or be stored in a RAM of terminal and in the form of software, so as to facilitate the processor(s) to execute corresponding steps of the aforementioned various modules.

Figure 9:
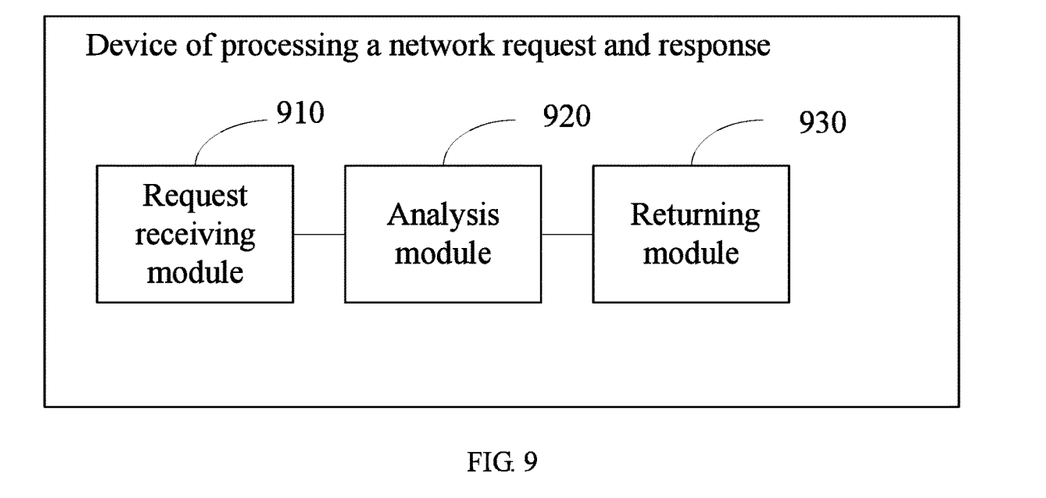
FIG. 9 is a block diagram of a device of processing a network request and response according to another embodiment.

Referring to FIG. 9, according to an embodiment, a device of processing a network request and response is provided, which includes a request receiving module 910, an analysis module 920, and a returning module 930.

The request receiving module 910 is used to receive a merged request transmitted by a client.

The client merges the generated multiple requests to obtain the merged request, and transmits the merged request to the server side. The server side receives the merged request transmitted by the client.

The analysis module 920 is used to analyze the merged request and obtain resource data corresponding to each request in the merged request.

After the server side receives the merged request transmitted by the client, the server side can analyze the merged request and obtain the resource data corresponding to each request in the merged request according to an analysis result.

Figure 10:
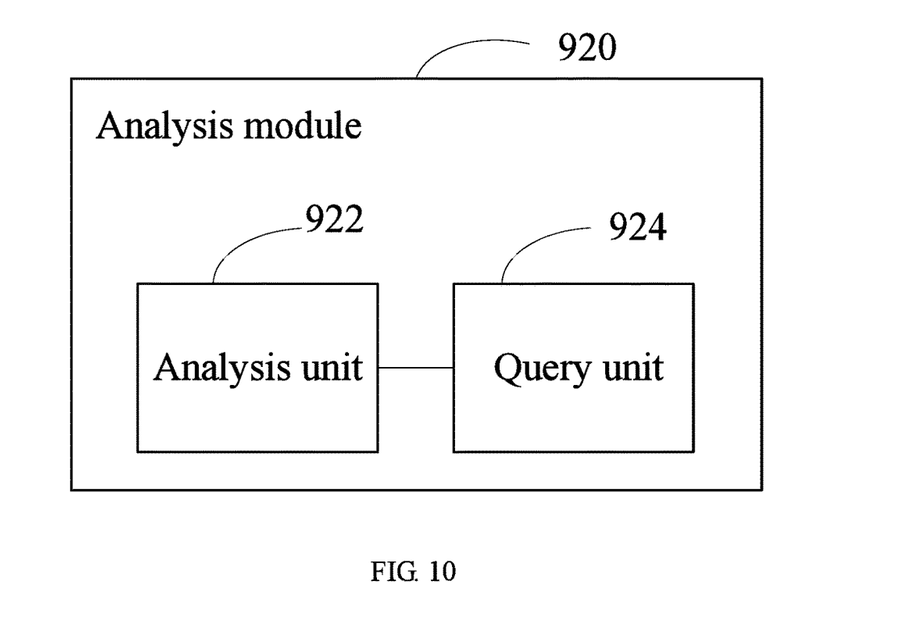
FIG. 10 is a block diagram of an analysis module according to an embodiment.

Referring to FIG. 10, according to an embodiment, the analysis module 920 includes an analysis unit 922 and a query unit 924.

The analysis unit 922 is used to analyze the merged request to obtain target parameters of each request according to a preset separator.

When the client performs merging requests, the resource data requested by the different requests can be separated by the preset separator. For example, "," is used as the separator to separate the resource data requested by the different requests. When the server side analyzes the merged request, the server side can analyze main body part of the merged request information according to the separator predetermined with the client to obtain the target parameters of each request, and the target parameter can be used to refer to the requested resource data.

The query unit is used to inquire the resource data corresponding to each request according to the target parameters of each request.

The server inquires and obtains the resource data corresponding to each request according to the target parameters of each request obtained by analyzing. For example, the server side analyzes the merged request to obtain the target parameters including a.css, b.css and c.css, i.e., the merged request contains three requests, which request a file a.css, a file b.css and a file c.css, respectively. Such that the server side inquires and obtains the corresponding file a.css, file b.css and file c.css according to the target parameters, and transmits the obtained resource data to the client.

The returning module 930 is used to separate the resource data corresponding to each request in the merged request by the boundary identification, and is used to return the separated resource data to the client. Such that when the client receives the resource data, the client obtains the boundary identification contained in the resource data, and extracts and processes the resource data corresponding to each request in the merged request one by one according to the obtained boundary identification.

The server side can transmit response information to the client and return the resource data corresponding to each request in the merged request to the client. The boundary identification can be added after the resource data corresponding to different requests in the merged request by the server side, so as to separate the resource data corresponding to the different requests. It is not essential for the server side to separate the resource data in the order of each request in the merge request. The boundary identification can include a separator line and a time stamp. The time stamp can be a sequence of characters used to refer to the time at which the server side transmits the resource data. The server side can return the separated resource data to the client. The client can detect the received resource data when the client receives the resource data corresponding to each request in the merged request returned by the server side. When the client detects that the boundary identification is contained in the received resource data, it means that the complete resource data corresponding to a request in the merged request has been successfully received, and this part of the resource data can be extracted for processing and using.

According to the aforementioned device of processing the network request and response, the server side receives the merged request transmitted by the client and analyzes the merged request to obtain the resource data corresponding to each request in the merged request. After the server side separates the resource data corresponding to different requests by the boundary identification, the separated resource data is returned to the client. Such that the client detects the boundary identification contained in the received resource data when receiving the resource data, and then extracts and processes the resource data corresponding to each request in the merged request one by one according to the obtained boundary identification. The client can extract and process the resource data requested by each request in the process of transmitting the resource data. There is no need to wait for all resource data to be transferred completely before using the resource data, which accelerates the response speed of each request in the case of merging the request, thereby speeding up the rendering display of the page.

The various modules of the device of processing the network request and response can be implemented, in part or as a whole, by software, hardware or the combinations thereof. For example, in terms of a hardware implementation, the aforementioned receiving module 910 can receive the merged request transmitted by the client on the terminal via a network interface of the server. The network interface can be an Ethernet card or a wireless card. The analysis unit 922 can analyze the merged request to obtain the target parameters of each request via the processor. The processor can be a central processing unit, and a microprocessor. The aforementioned modules can be embedded in or independent from the processor(s) of the server, or be stored in a RAM of server and in the form of software, so as to facilitate the processor(s) to execute corresponding steps of the aforementioned various modules.

A person skilled in the art should understand that the processes of the methods in the above embodiments can be, in full or in part, implemented by computer programs instructing underlying hardware, the programs can be stored in a computer-readable storage medium, the program can include the processes in the embodiments of the various methods when it is being executed. The storage medium can be a disk, a CD, a Read-Only Memory (ROM) and other non-transitory storage mediums or a RAM and so on.

The different technical features of the above embodiments can have various combinations which are not described for the purpose of brevity. Nevertheless, to the extent the combining of the different technical features do not conflict with each other, all such combinations must be regarded as being within the scope of the disclosure.

The foregoing implementations are merely specific embodiments of the present disclosure, and are not intended to limit the protection scope of the present disclosure. It should be noted that any variation or replacement readily figured out by persons skilled in the art within the technical scope disclosed in the present disclosure shall all fall into the protection scope of the present disclosure. Therefore, the protection scope of the present disclosure shall be subject to the protection scope of the claims.

What is claimed is:

1. A method of processing a network request and response, comprising:
   merging a plurality of HTTP resource requests to obtain a merged request;
   transmitting the merged request to a server side;
   detecting a current status identification of the merged request;
   receiving, when the status indicated by the current status identification shows that data is transferring, receiving resource data corresponding to each request in the merged request and returned by the server side;
   first obtaining a first boundary identification contained in the received resource data, the first boundary identification identifying that complete resource data responsive to a first HTTP resource request in the merged request has been successfully received;
   first extracting and processing the HTTP resource data corresponding to the first HTTP request in the merged request according to the obtained boundary identification; and
   stopping receiving the resource data, when the status indicated by the current status identification shows that the data transferring is completed;
   wherein the first extracting and processing begins before receipt of all of the complete resource data for all of the HTTP requests of the merged request.

2. The method of claim 1, wherein after stopping receiving the resource data, when the status indicated by the current status identification shows that the data transferring is completed, the method further comprises:

extracting and processing the resource data received after the last obtained boundary identification.

3. The method of claim 1, wherein the merging the plurality of requests to obtain the merged request comprises:
merging requests which request for resource data with the same type in a preset manner to obtain the merged request, wherein the preset manner can be that predefining a separator to separate resources data requested by different requests.

4. The method of claim 1, wherein the boundary identification is configured to identify the resource data uniquely, and the boundary identification can comprises a time stamp and a separator line.

5. The method of claim 1, wherein the stopping receiving the resource data, when the status indicated by the current status identification shows that the data transferring is completed comprises:
receiving a message segment with an end mark, wherein the status indicated by the current status identification of the merged request shows that the data transferring is completed, and
closing a connection with the server side.

6. The method of claim 1, further comprising:
second obtaining, after the first obtaining, a second boundary identification contained in the received resource data, the second boundary identification identifying that complete resource data responsive to a second HTTP resource request in the merged request has been successfully received; and
second extracting and processing, the HTTP resource data corresponding to the second HTTP resource request in the merged request according to the obtained boundary identification;
wherein the second extracting and processing begins after commencement of the first extracting and processing and before receipt of all of the complete resource data for all of the requests of the merged request.

7. A terminal comprising a processor, and a memory storing computer executable instructions, which, when executed by the processor cause the processor to perform steps comprising:
merging a plurality of HTTP resource requests to obtain a merged request;
transmitting the merged request to a server;
detecting a current status identification of the merged request;
receiving, when the status indicated by the current status identification shows that data is transferring, receiving resource data returned by the server and corresponding to each request in the merged request;
first obtaining a first boundary identification contained in the received resource data, the first boundary identification identifying that complete resource data responsive to a first HTTP resource request in the merged request has been successfully received;
first extracting and processing the HTTP resource data corresponding to the first request in the merged request according to the obtained boundary identification; and
stopping receiving the resource data, when the status indicated by the current status identification shows that the data transferring is completed;
wherein the first extracting and processing begins before receipt of all of the complete resource data for all of the HTTP requests of the merged request.

8. The terminal of claim 7, wherein the computer executable instructions, which, when executed by the processor, cause the processor to perform steps comprising: after step of stopping receiving the resource when the status indicated by the current status identification shows that the data transferring is completed, extracting and processing the resource data received after the last obtained boundary identification.

9. The terminal of claim 7, wherein the merging the plurality of requests to obtain the merged request comprises:
merging requests which request for resource data with the same type in a preset manner to obtain the merged request, wherein the preset manner can be that predefining a separator to separate resources data requested by different requests.

10. The terminal of claim 7, wherein the boundary identification is configured to identify the resource data uniquely, and the boundary identification can comprises a time stamp and a separator line.

11. The terminal of claim 7, wherein the stopping receiving the resource data, when the status indicated by the current status identification shows that the data transferring is completed comprises:
receiving a message segment with an end mark, wherein the status indicated by the current status identification of the merged request shows that the data transferring is completed, and
closing a connection with the server side.

12. The terminal of claim 7, the steps further comprising:
second obtaining, after the first obtaining, a second boundary identification contained in the received resource data, the second boundary identification identifying that complete resource data responsive to a second HTTP resource request in the merged request has been successfully received; and
second extracting and processing, the HTTP resource data corresponding to the second HTTP resource request in the merged request according to the obtained boundary identification;
wherein the second extracting and processing begins after commencement of the first extracting and processing and before receipt of all of the complete resource data for all of the requests of the merged request.

13. At least one non-transitory computer-readable medium comprising computer executable instructions, which, when executed by at least one processor cause the at least one processor to perform steps comprising:
merging a plurality of HTTP resource requests to obtain a merged request;
transmitting the merged request to a server;
detecting a current status identification of the merged request;
receiving, when the status indicated by the current status identification shows that data is transferring, receiving resource data returned by the server and corresponding to each request in the merged request;
first obtaining a first boundary identification contained in the received resource data, the first boundary identification identifying that complete resource data responsive to a first HTTP resource request in the merged request has been successfully received;
first extracting and processing the HTTP resource data corresponding to the first HTTP request in the merged request one by one according to the obtained boundary identification; and
stopping receiving the resource data, when the status indicated by the current status identification shows that the data transferring is completed;

wherein the first extracting and processing begins before receipt of all of the complete resource data for all of the HTTP requests of the merged request.

14. The non-transitory computer-readable medium of claim 13, wherein the computer executable instructions, which, when executed by the at least one processor, cause the at least one processor to perform steps comprising:

after step of stopping receiving the resource when the status indicated by the current status identification shows that the data transferring is completed, extracting and processing the resource data received after the last obtained boundary identification.

15. The non-transitory computer-readable medium of claim 13, wherein the merging the plurality of requests to obtain the merged request comprises:

merging requests which request for resource data with the same type in a preset manner to obtain the merged request, wherein the preset manner can be that predefining a separator to separate resources data requested by different requests.

16. The non-transitory computer-readable medium of claim 13, wherein the boundary identification is configured to identify the resource data uniquely, and the boundary identification can comprises a time stamp and a separator line.

17. The non-transitory computer-readable medium of claim 13, wherein the stopping receiving the resource data, when the status indicated by the current status identification shows that the data transferring is completed comprises:

receiving a message segment with an end mark, wherein the status indicated by the current status identification of the merged request shows that the data transferring is completed, and closing a connection with the server side.

18. The media of claim 13, the steps further comprising:

second obtaining, after the first obtaining, a second boundary identification contained in the received resource data, the second boundary identification identifying that complete resource data responsive to a second HTTP resource request in the merged request has been successfully received; and second extracting and processing, the HTTP resource data corresponding to the second HTTP resource request in the merged request according to the obtained boundary identification;

wherein the second extracting and processing begins after commencement of the first extracting and processing and before receipt of all of the complete resource data for all of the requests of the merged request.

* * * * *